United States Patent
Han

[11] Patent Number: 5,965,289
[45] Date of Patent: Oct. 12, 1999

[54] SEPARATOR FOR BATTERIES

[75] Inventor: Kyeng-ho Han, Chungchongnam-do, Rep. of Korea

[73] Assignee: Samsung Display Devices Co., Ltd., Rep. of Korea

[21] Appl. No.: 09/000,903

[22] Filed: Dec. 30, 1997

[30] Foreign Application Priority Data

Dec. 30, 1996 [KR] Rep. of Korea ............... 96-64425

[51] Int. Cl.$^6$ ........................................... H01M 2/18
[52] U.S. Cl. ................ 429/62; 429/62; 429/142; 429/144
[58] Field of Search ................ 429/62, 135, 138, 429/141, 144, 145

[56] References Cited

U.S. PATENT DOCUMENTS 5,213,722  5/1993  Iwasaki et al. .................. 264/22

*Primary Examiner*—Maria Nuzzolillo
*Assistant Examiner*—Monique Wills
*Attorney, Agent, or Firm*—Christie, Parker & Hale, LLP

[57] ABSTRACT

A separator for a battery includes a first separating layer for preventing a short circuit between a positive electrode and a negative electrode and a second separating layer having higher electrolyte retaining power than the first separating layer. The second separating layer is attached on the first separating layer. The second separating layer is made of polyethylene terephtalate, and the first separating layer is selected from the group consisting of nylon and polypropylene. Preferably, the first separating layer is attached on the second separating layer through a thermal fusing process.

13 Claims, 1 Drawing Sheet

SEPARATOR FOR BATTERIES

FIELD OF THE INVENTION

The present invention relates to a separator for a battery and a battery having the same.

BACKGROUND OF THE INVENTION

Generally, an electrode assembly of batteries comprises a positive electrode, a negative electrode, and a separator disposed between the positive and negative electrodes. The separator is designed to be larger than the positive and negative electrodes to prevent a short circuit between the negative and positive electrodes. A nonwoven fabric made of a polyamide resin such as a nylon material or a polyolefin resin such as a polypropylene material has been used for the separator.

However, the use of the above materials for the separator has drawbacks. Namely, the separator using the nonwoven fabric made of nylon material may, when used in a nickel-metalhydride battery, cause charge retention of the battery to deteriorate. That is, $NH_{4-}$ of the nylon causes the battery to self-discharge. As a result, the separator using the nonwoven fabric made of polypropylene material has to go through a complicated hydrophilic treatment process.

In addition, separators made of the above two materials cannot provide sufficient electrolyte-retaining power.

SUMMARY OF THE INVENTION

For the foregoing reasons, there is a need for a separator that has a high degree of electrolyte-retaining power and aqueous absorbing power and that can be easily made.

The present invention is directed to a separator for a battery that satisfies the above needs.

According to one aspect of the present invention, a separator for a battery comprises a first separating layer for preventing a short circuit between a positive electrode and a negative electrode and a second separating layer having higher electrolyte retaining power than the first separating layer. The second separating layer is attached on the first separating layer.

Preferably, the second separating layer is made of polyethylene terephthalate, and the first separating layer is selected from the group consisting of nylon and polypropylene.

Preferably, the first separating layer is attached on the second separating layer through a thermal fusing process.

According to another aspect of the present, a battery comprises an electrode assembly having a positive electrode, a negative electrode, and a separator disposed between the positive and negative electrodes; a cap assembly coupled to the positive electrode; and a can in which the electrode assembly is disposed and which is coupled to the negative electrode. The separator comprises a first separating layer for preventing a short circuit between a positive electrode and a negative electrode; and a second separating layer having high electrolyte retaining power, the second separating layer being attached on the first separating layer.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF PREFERRED EMBODIMENT

Figure 1:
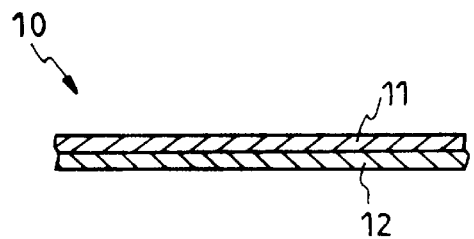
FIG. 1 is a partial enlarged view illustrating a separator in accordance with a preferred embodiment of the present invention.

The following is the description of the preferred embodiments according to the present invention. In the drawings, like reference numerals have been used to identify like elements in each figure.

Referring first to FIG. 1, there is shown an enlarged partial sectional view of a separator 10 in accordance with a preferred embodiment of the present invention. The inventive separator 10 comprises a first separating layer 11 and a second separating layer 12 attached on the first separating layer 11 through a thermal fusing process.

The first separating layer 11 is made of a polyamide resin such as a nylon material or a polyolefin resin such as a polypropylene material which are effective in preventing short circuits and have good tensile strength. The second separating layer 12 is made of a material such as polyethylene terephthalate which is effective for electrolyte retention and aqueous absorbing. Generally, it is well known that polyethylene terephathalate provides a considerable degree of in electrolyte retention force and aqueous absorbing force. Therefore, it is possible to use a separator made solely from polyethylene terephthalate, but there is a drawback in doing so. Namely, the separator made of this material can be damaged when it is wound around a mandmill because of its limited tensile strength. Thus, in this embodiment, a material such as nylon or polypropylene which have high tensile strength is used by being attached on the second separating layer 12 made of the polyethylene terephthalate.

Figure 2:
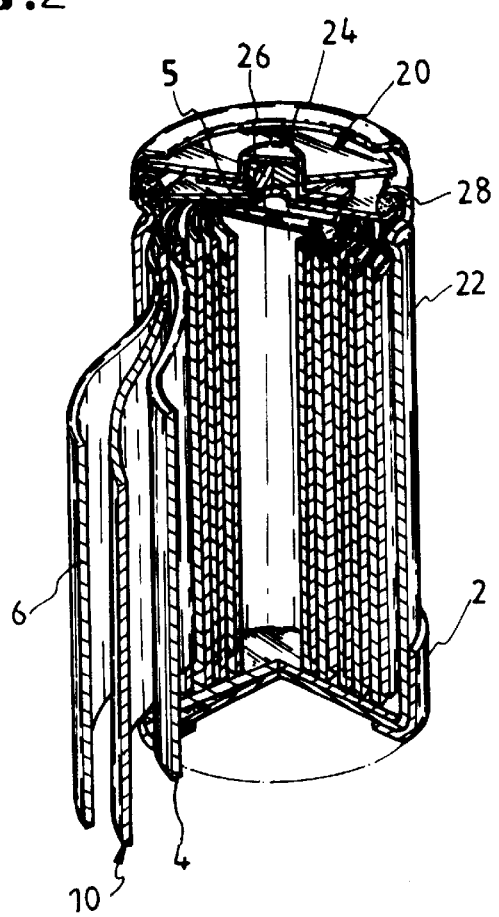
FIG. 2 is a partial sectional perspective view illustrating a battery in which the separator of the present invention is applied.

FIG. 2 shows a cylindrical battery where the inventive separator is applied. The cylindrical battery comprises an electrode assembly having a positive electrode 4, a negative electrode 6, and the separator 10 disposed between the positive and negative electrodes 4 and 6; a cap assembly 20 coupled to the positive electrode 4; and a can 2 in which the electrode assembly is inserted and which is coupled to the negative electrode 6.

The electrode assembly is rolled around a mandrill (not shown). The separator 10 is disposed such that the first separating layer 11 contacts the negative electrode 6 and the second separating layer 12 contacts the positive electrode 4.

The cap assembly 20 comprises a cap 22 provided with a discharge hole through which gases escape. A cap cover 24 is coupled on the cap 22 and provided at its central portion with a gas discharge hole (not shown). The cap cover 24 is connected to the positive electrode 4 through a tab member 5. Disposed between the cap cover 24 and the cap 22 is an elastic member 26 for controlling the open/close operation of the discharge hole of the cap 22 in accordance with the pressure created within the battery. Interposed between the can 2 and the cap assembly 20 is a gasket 28 for sealing and insulating a space therebetween.

As described above, in the present invention, since the amount of nylon or polypropylene used as the separator can be greatly reduced, the drawbacks caused by these materials can be minimized.

While this invention has been described in connection with what is presently considered to be the most practical and preferred embodiments, it is to be understood that the invention is not limited to the disclosed embodiment, but, on the contrary, it is intended to cover various modifications and equivalent arrangements and methods included within the spirit and scope of the appended claims.

What is claimed is:

1. A separator for a battery having a positive and a negative electrode, comprising:

A first separating layer for preventing a short circuit between said positive and negative electrodes of the battery; and a second separating layer attached to said first separating layer;

wherein said first separating layer has a tensile strength higher than a tensile strength of the second separating layer, and said second separating layer has a higher electrolyte retaining power and a higher aqueous absorbing power than an electrolyte retaining power and an aqueous absorbing power of the first separating layer.

2. A separator according to claim 1 wherein said second separating layer comprises a polyethylene terephtalate.

3. A separator according to claim 2 wherein said first separating layer comprises a material selected from the group consisting of polyamide resin and polyolefin resin.

4. A separator according to claim 1 wherein said first separating layer is attached to said second separating layer through a thermal fusing process.

5. A separator according to claim 3 wherein the polyamide resin comprises a nylon.

6. A separator according to claim 3 wherein the polyolefin resin comprises a polypropylene.

7. A battery, comprising:

an electrode assembly having a positive electrode, a negative electrode, and a separator disposed between said positive and negative electrodes;

a cap assembly coupled to the positive electrode;

a can coupled to the negative electrode, said electrode assembly being disposed in said can;

wherein the separator comprises:

a first separating layer for preventing a short circuit between the positive and negative electrodes, and a second separating layer attached to said first separating layer, wherein said first separating layer has a tensile strength higher than a tensile strength of the second separating layer, and said second separating layer has a higher electrolyte retaining power and a higher aqueous absorbing power than an electrolyte retaining power and an aqueous absorbing power of the first separating layer.

8. A separator according to claim 7 wherein said second separating layer comprises a polyethylene terephtalate.

9. A separator according to claim 8 wherein said first separating layer comprises a material selected from the group consisting of a polyamide base and polyolephine base.

10. A separator according to claim 7 wherein said first separating layer is attached to said second separating layer through a thermal fusing process.

11. A separator according to claim 9 wherein the polyamide base comprises a nylon material.

12. A separator according to claim 9 wherein the polyolephine base comprises polypropylene material.

13. A battery according to claim 7 wherein the separator is disposed between the positive and negative electrodes such that the first separating layer contacts the negative electrode and the second separating layer contacts the positive electrode.

* * * * *